July 7, 1970  A. K. CHITAYAT  3,518,925
MEANS AND METHODS OF MARKING FILM
Filed Sept. 7, 1965  4 Sheets-Sheet 1
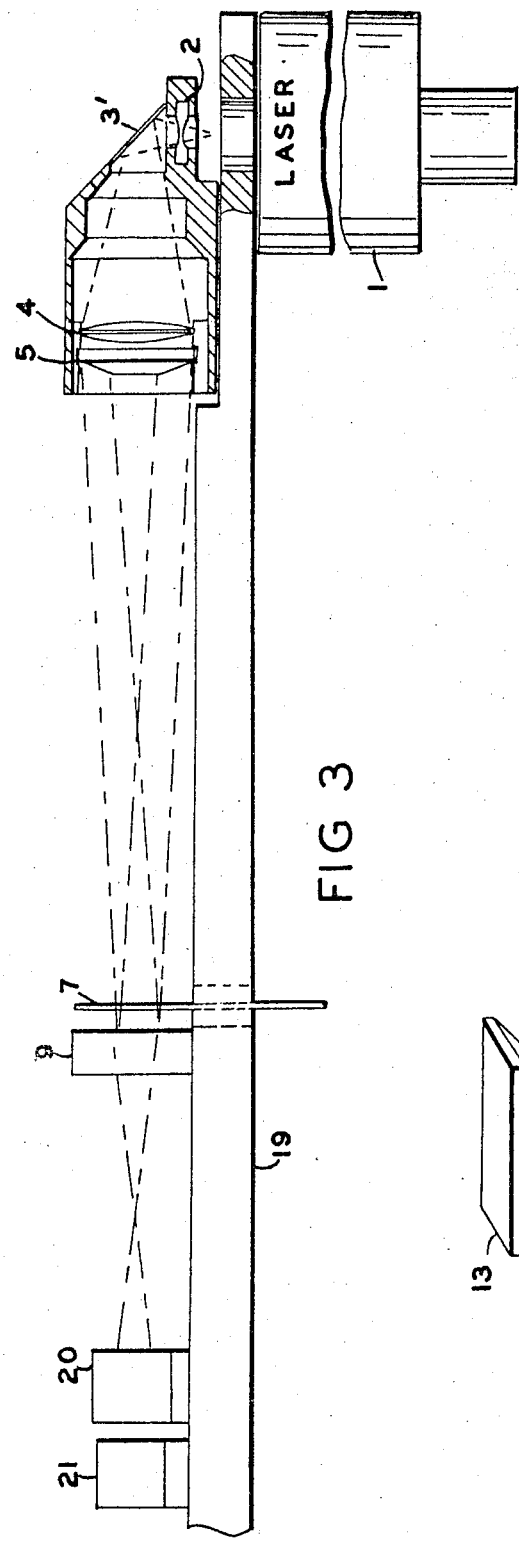
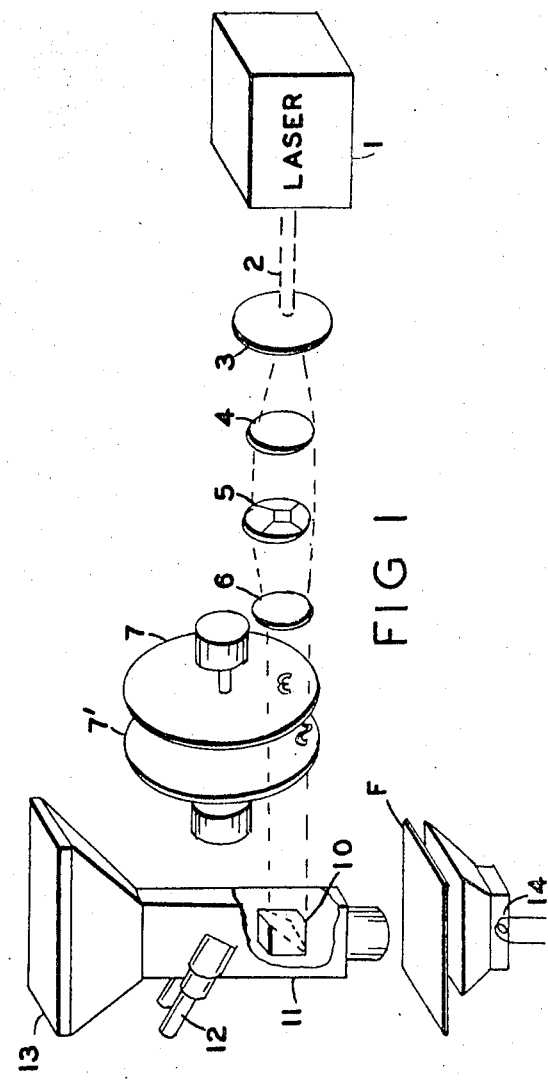
INVENTOR.
ANWAR K. CHITAYAT
BY

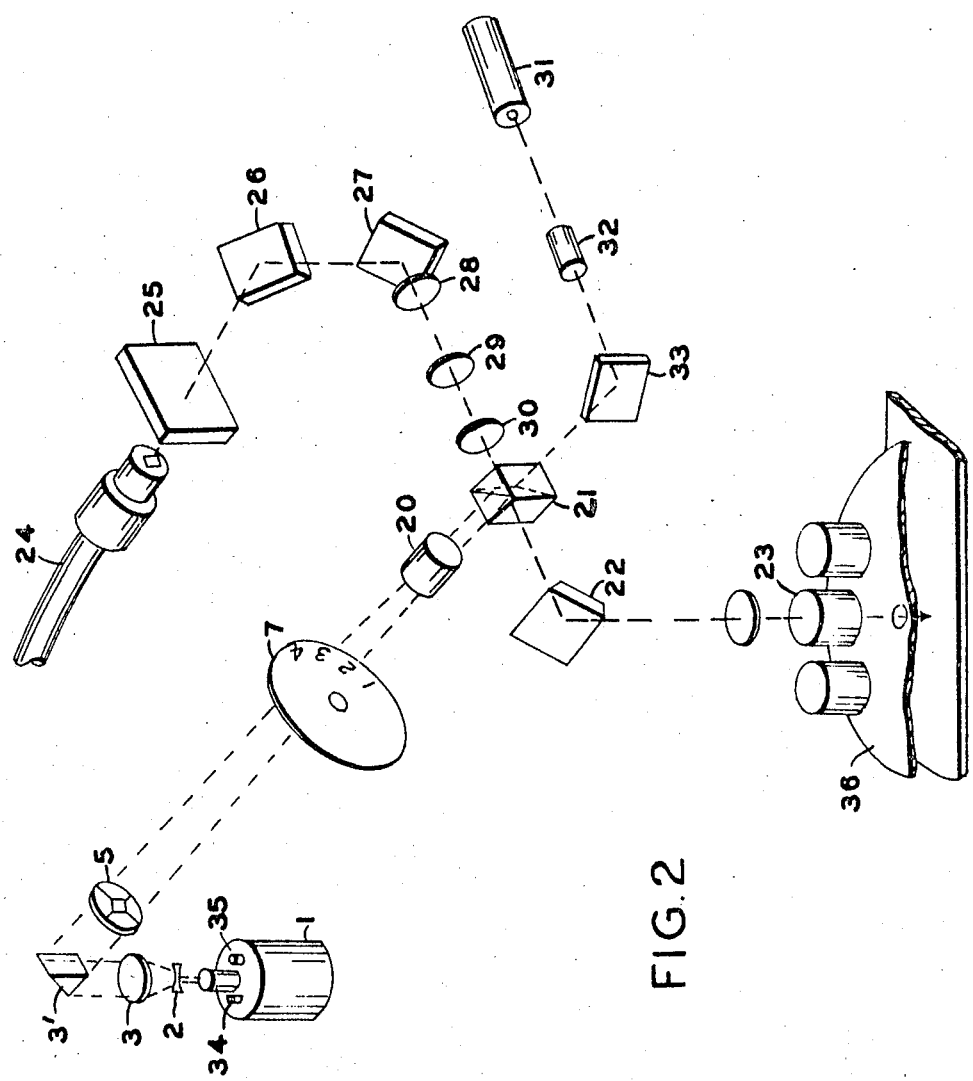

United States Patent Office 3,518,925
Patented July 7, 1970

3,518,925
MEANS AND METHODS OF MARKING FILM
Anwar K. Chitayat, Plainview, N.Y., assignor to Optomechanisms, Inc., Plainview, N.Y.
Filed Sept. 7, 1965, Ser. No. 485,198
Int. Cl. G03b 17/24
U.S. Cl. 95—1.1                           1 Claim

ABSTRACT OF THE DISCLOSURE

The invention provides a microscope for accurately indicating an object and marking the object with a laser beam. The laser beam is focused and is reflected by a beam splitter in the microscope and onto the object which may be a film, so that the beam forms a permanent mark on the object.

---

This invention relates to laser marking means and methods and more particularly to such means using a laser beam to place a projectable mark on film.

More particularly the invention relates to means for placing a transparent dye and then impinging a shaped or formed laser beam onto the dye so as to produce an identifiable, projectable mark.

It is frequently desirable to mark points on film for instance, in the evaluation of aircraft reconnaissance film or for photographic mapping. It is desirable to do this optically in order to achieve greater accuracy and flexibility. It is also desirable that the markings be projectable and preferably desirable that the markings may be seen with the naked eye or through a microscope.

The general technique of the present invention is to mark the film with characteristic marking shapes such as a circle or a cross and/or a number of letters by means of a radiant energy beam which affects a dye deposited on the film. The radiant energy beam source may be a laser. The laser beam may pass through a reticle in order to form the beam into the shape desired and the beam is impinged upon the dye on the film. The radiant energy causes some of the dye to vaporize or be otherwise removed or displaced making a clear mark for instance a cross where it is desired to mark on the film. The laser beam is pulsed when it is desired to mark the film so that the radiant energy is not dissipated to the adjacent areas, resulting in very sharp, well defined marks. The addition of lenses in the beam path enhances the operation by focusing the image from a well defined reticle onto the film.

The laser beam is too small in diameter to completely cover a practical size reticle, and therefore, the beam must be enlarged. Also the laser beam must be collimated since it is non-uniform.

Another reason for enlarging the beam is to lower the average energy density which is apt to damage the optical element of mounting. Prismatic lenses are preferably used to obtain a more uniform energy density through the lenses.

Finally, it is desired that the mark placed on the film be very small, for instance dots on the order of 30 microns in diameter. Therefore, it is necessary to have proper optics in order to focus the mark.

Accordingly, a principal object of the invention is to provide new and improved film marking means.

Another object of the invention is to provide new and improved film marking means using a dye placed on the film.

Another object of the invention is to provide new and improved film marking means which makes marks on the film which are projectable.

Another object of the invention is to provide new and improved film marking means utilizing a radiant beam.

Another object of the invention is to provide new and improved film marking means utilizing a laser beam.

Another object of the invention is to provide new and improved film marking means utilizing a laser beam, a reticle to form the beam and means to hold film in front of the reticle.

Another object of the invention is to provide new and improved film marking means comprising a radiant energy beam and means to form the beam on film.

Another object of the invention is to provide new and improved means for marking film using a transparent dye and a laser beam to place an identifiable mark on said dye.

Another object of the invention is to provide new and improved means and methods for placing a transparent dye on the film and marking said dye with a laser beam.

Another object of the invention is to provide new and improved means for placing a dye on film, producing a laser beam forming said beam into an identifiable shape and marking said film with said beam.

Another object of the invention is to provide new and improved optical means for shaping and forming a laser beam.

Another object of the invention is to provide new and improved means and methods for marking film comprising a film supporting means, a means to apply a spot of dye on the film, a laser generator, optical means to enlarge said laser beam, reticle means to form said laser beam, additional optical means to focus such formed laser beams at the said dye spot whereby providing an identifiable mark on said film.

These and other objects of the invention will be apparent in the following specification and drawings of it.

FIG. 1 is a schematic diagram of an embodiment of the invention.

FIG. 2 is a perspective schematic diagram of an embodiment of the invention.

FIG. 3 is a detail view of the optical system of the embodiment of FIG. 2.

Figure 4:
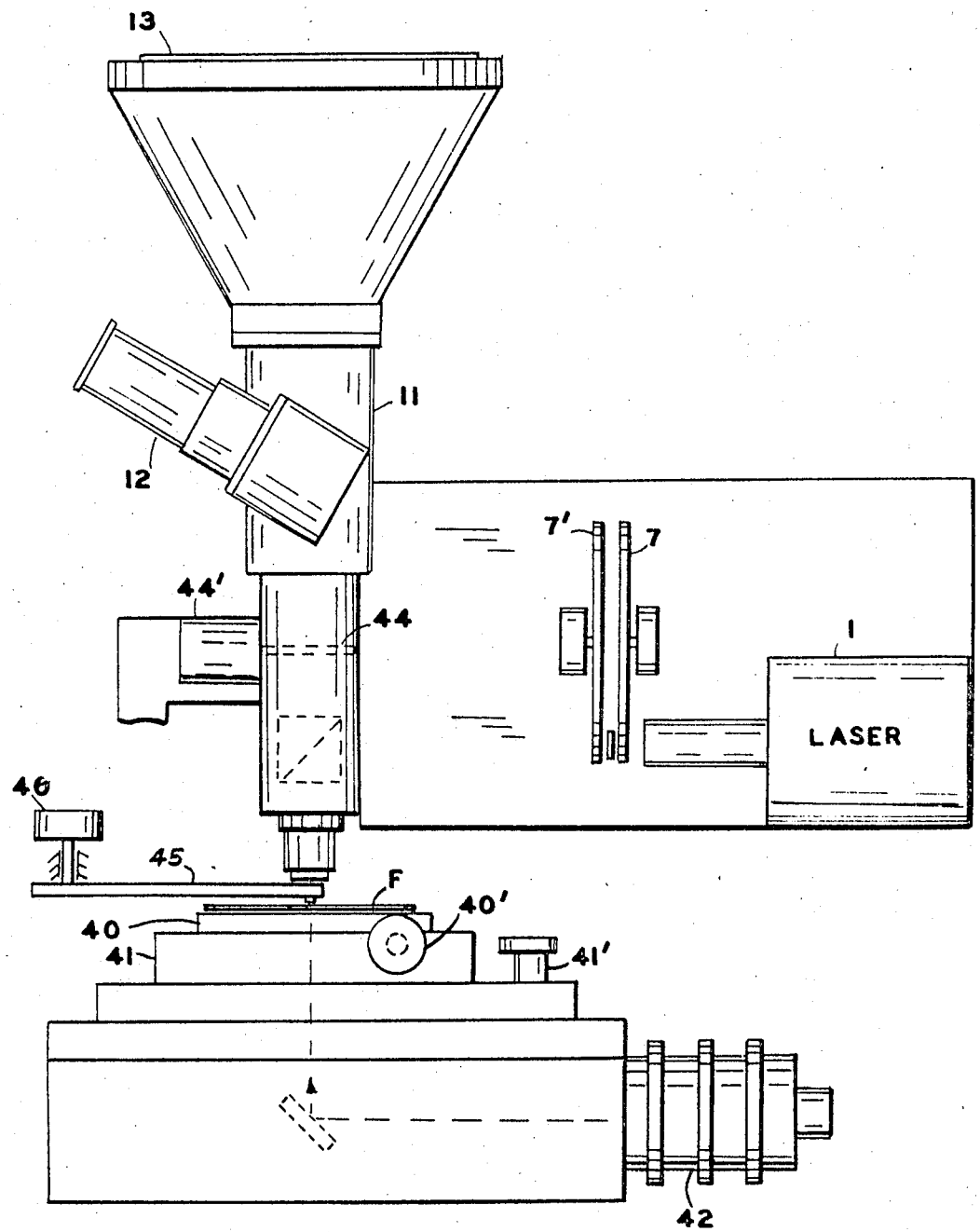
FIG. 4 is a schematic view of an embodiment of the invention.

A laser beam having a wavelength in the red or near infrared region has the characteristics of being transmitted through clear gelatin or clear film base.

This same wavelength, however, is readily absorbed by the atomic silver which constitutes the image in a piece of film. Photographic silver is grayish to black in appearance and, therefore, is a highly efficient absorber of red energy. The amount of energy absorbed is a direct function of mass, and indirectly a function of density. The higher the density the more energy will be absorbed. Conversely, the less the density, the less energy will be absorbed. For a true zero density, no laser energy is absorbed.

In order to overcome this problem, the applicant has developed a technique by which a special dye is placed on the clear areas of the film. This dye absorbs the laser energy, yet does not alter the appearance of the photographic image.

This dye has the following major characteristics:

(1) The dye itself is a molecular level colored solution. There are no particle sizes involved that would limit the resolution.

(2) It has a rapid and uniform diffusion rate into the gelatin emulsion.

(3) It is free from dust and bubble defects.

(4) Properly applied, there is little edge to center density difference.

(5) The dye peak absorbtion band can be changed to absorb energies of a different wavelength.

(6) It can be dried rapidly in the presence of warm blowing air when properly applied. Another method of drying utilizes a wiper that automatically "wipes off" the excess dye on top to achieve quick drying. The applicant has achieved drying time in 10–20 seconds.

(7) It can be marked even if the freshly dyed area hasn't dried completely.

(8) It can be applied by a syringe or spray method.

The dye formula can be adjusted to give various dye deposits under different conditions.

The formula basically is as follows:

1 part Eastman Kodak Cyan Dye (dye transfer dye).
3 parts approximately 7% acetic acid.
Several drops Eastman Kodak Photoflu.

Apply on film with a hypodermic syringe. Allow to remain on film 2–5 seconds. Wipe off with a felt pad wet with approximately 7% acetic acid.

When applied to clear emulsion and then checked for optical density on the Macbeth densitometer, the optical density with the red filter in the densitometer is preferably about .3 to .4.

As previously mentioned, the energy absorbed by the film is a function of density. This is only true however when sufficient energy is available such that a minimum absorption causes a mark to be made on a film. If the laser energy is below this threshold, the mark is not formed independent of film density.

Above this threshold energy there exists an optimum exposure for best resolution. This optimum will vary due to the following parameters:

(1) Type of film
(2) Density
(3) RMS distribution of silver size
(4) Silver spacing
(5) Film base—glass or flexible
(6) Dye
(7) Desired resolution
(8) Type of laser
(9) Wavelength
(10) Duration of pulse
(11) Optical system Initial studies have determined that if a dye solution in the emulsion is used, then the parameters of the emulsion density, and the film characteristics have less effect on the mark. Consequently, a more reliable mark is produced.

Figure 5:
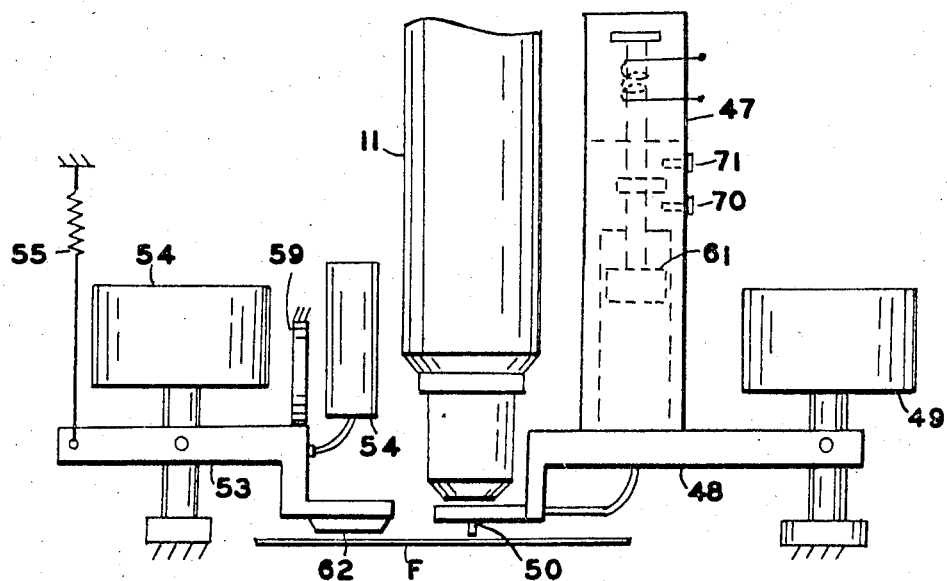
FIG. 5 is a schematic view of a modification of the invention.

The special cyan dye is best applied in the form of a drop from a hypodermic syringe (see FIG. 5).

The drop should remain on the film for a predetermined time (depending on the dye formula concentration) and the extent of dying desired. This time may be adjusted to 2 seconds, approximately, at the end of the predetermined time a solenoid operated wiper will remove the excess dye. The wiper, when not in use will rest against a pad that will keep the wiper wet with an acetic chemical. This chemical will allow the excess dye to be wiped off without causing any smears. This technique permits the information of a clear, clean, uniform, and reasonably dry dye deposit in which laser marks of exceptional quality can be made.

The automatic application preferably uses a timing circuit that automatically applies a predetermined amount of dye. The wiping will be achieved 2 seconds later. The operator may then observe the image for final alignment, and the laser may then be fired. The mask may then be observed by the operator immediately after firing.

The film marking system contains the following major subassemblies (see FIGS. 1, 2 and 3):

(1) Dye applying mechanism to uniformly spray a predetermined area. The exact configuration of this system shall be determined as a result of the study and analysis.

(2) A ruby pulsed laser head, with an optical telescopic lens system to gather the illumination onto a mask.

(3) Metallized or photographic mask located on a turret, whose configuration is the same as the mask to be made on the dye.

(4) Lens system to relay the image of the mask onto the film.

(5) Microscope for observing the image of the film prior to, and after marking, with means of focusing and illumination.

(6) Film stage, and glass plate holder to allow precise positioning of the film under the microscope.

FIG. 1 illustrates the general configuration of the optical system. This configuration may change, based on the results of the study, for particular uses.

A conventional laser 1 provides a beam 2 which is enlarged and collimated by means of the lenses 3, 4, and 5. The beam is focused by the field lens 6 onto a reticle 7 which may have a plurality of numbers cut out of it. The reticle is in the form of a masked disc which is rotated as desired so that a desired number or mark may be placed within the beam. If desired a plurality of masks 7, 8 may be mounted so that double numbers may be used.

The beam passes from the reticle to a beam splitter 10 which is mounted in the otherwise conventional microscope 11. The laser beam then passes down through the microscope objective lens and onto the film F. The viewer looks through the eyepieces 12 of the microscope or through the top viewing screen 13, which may be mounted on top of the microscope. The film is preferably illuminated from underneath by means of the light 14. The film is located under the microscope so that the spot for the marking is accurately placed. The operator will then fire the laser to place an identifiable mark on the film.

A standard microscope is supplied with a 5× objective and 3 interchangeable eyepieces (5×, 10× and 20×). The microscope is modified to include a beam splitter, allowing the energy of the laser to pass through to the film.

The laser may be for instance a conventional Raytheon (2 joule) pulse ruby laser. The head is small, 3 inch diameter x 4½ inches long, with provision for air cooling, for fast repetition rates of marking. The power supply contains a meter to show the energy being applied to the laser, in addition to a control dial to adjust that energy.

The output of the laser is a beam of approximately ⅛ inch in diameter. The uniformity of the illumination is dependent on the condition of the ruby, and its temperature. Consequently, the output illumination is recollimated and expanded by the optical telescope. This beam is subdivided and recombined in a optical system to result in a uniformly distributed illumination over the desired area of the mask 7. One purpose of the optical system is to assure good performance even with the non-uniformity of the laser beam.

The other important parameter of the optical system is to provide a beam which approximately fills the aperture of the microscope lens in order to result in maximum contrast and maximum resolution.

The output of the illumination is uniformly distributed over the desired mask area. The masks 7 and 8 consist of thin sheet metal, which is engraved so that material is removed where desirable. Letters, numbers, dots, and circles can be placed on the mask if desired. Another method of manufacturing the mask is by photoetching. The mask is not affected by the laser energy, since the power density applied to the mask is relatively low, due to its relatively large size.

The magnification of the system described above is illustrated as typical.

An auxiliary illuminator is preferably provided to allow for illumination of the mask from a filamentary lamp. A control is provided to put that lamp on and off, and to vary its illumination. The presence of the lamp allows observation of the film image, and the image of the mark prior to film marking.

The microscope 11 is used with an illuminator 14 from under the film F to allow observation of the film transparency. The film is mounted on a movable stage to allow movement of the film, and 1° cating it precisely at the area of interest. A cross hair reticle and measuring reticle are preferably provided at the eyepiece to allow precise 1 cation and measurement. In addition to an eyepiece, a 4 x 4 screen is provided on the top, as shown in FIG. 1. In this manner, the operator may either select to observe the image at the eyepiece or screen.

FIG. 2 is another embodiment of the invention in a film viewing device.

This is similar system to that described in FIG. 1. The beam is transmitted via the lenses 2· 3 and a reflector 3' and lens 5 to the reticle 7, through the relay lens 20, beam splitter 21, mirror 22, lens 22' and objective lens 23 onto the film F.

The film is viewed by the observer through the fiber optic cable 24, image enhancer 25, mirrors 26 and 27, lenses 28, 29 and 30 and the beam splitter 21. The projector 31 passes a light beam through the lens 32 and mirror 33 to the beam splitter 21. This light beam may be a dot or a circle which the operator uses to line up the form before activating the laser.

The reticle marks themselves may be projected by mounting illumination lights 34 and 35 on the laser. The objective lens 23 may be mounted on a turret 36 which may contain a plurality of other lenses for different magnifications.

FIG. 3 shows a detail view of the optics of the embodiment of FIG. 2. The laser 1 is mounted to project a beam upwards of the lens 2 and 3 and to the mirror 3', and then to the converging lens 4 and prismatic lens 5 onto the reticle 7, then through a field lens 9, relay lens 20, to the beam splitter 21. All of these elements are mounted on the base plate 19.

FIG. 4 shows an embodiment of the invention. The film is preferably mounted on a pair of movable stages 40 and 41. Stage 41 is preferably movable in the X-axis of the machine by means of the adjustment 41' and stage 40 is mounted on top of the stage 41, and movable along the Y-axis at 90° to the X-axis by means of the adjustment 40'. The film is preferably illuminated from underneath by means of the lamp 42 and mirror 43.

The microscope arrangement is similar to that previously discussed except it has added to it a shutter 44 which may be activated by solenoid 44'.

The purpose of the shutter is to protect the operator from the laser beam. A dye applicator 45 is preferably mounted under the microscope. For instance, it may be rotatably mounted and operated by rotary solenoid 46 as more fully discussed in connection with FIG. 5.

FIG. 5 shows an arrangement for applying the dye. A dye reservoir 47 is mounted on a rotatable base 48 which is adapted to be activated by a rotary solenoid 49. The reservoir is connected to a discharge nozzle 50 and the nozzle is located so that when the stage 48 is in the operative position then the dye is discharged immediately under the center of the microscope. The reservoir preferably has a solenoid operated piston 61 which may be activated to deposit predetermined amount of dye on the film F by means of adjustable stops 70, 71. In order to expedite the applying of the dye, a wiper 62 may be used to dry the dye. The wiper is preferably mounted on another rotary stage 53 and has its own reservoir 54 of drying solution. The stage 53 is preferably activated by means of a rotary solenoid 54 and a predetermined amount of pressure placed on the wiper by means of the spring 55 and fixed cam 59. In FIG. 5, the wiper is shown in a retracted position. Both the dye applicator and the wiper mechanism may be automatically timed by conventional apparatus.

Figure 6:
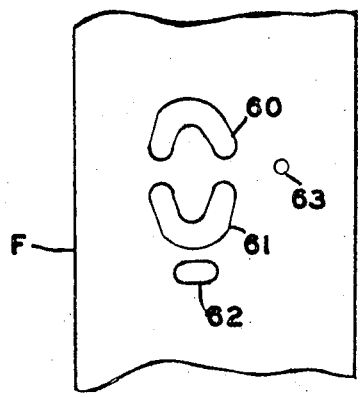
FIG. 6 is a diagram illustrating the types of marks placed on the film.

FIG. 6 shows typical marks which may be placed by the laser beam. For instance, it may be desirable to enclose a predetermined portion of the film inside of the loops 60 and 61. Oval shape marker 62 may be used, or dot 63. By the use of the optics in the present invention the size of the dots may be reduced in diameter to the order of 30 microns.

The operation of the laser marking system is done in the following steps:

(1) Move the film until the area of interest is located in the center of the cross hair of the microscope.

(2) Switch auxiliary illumination system on until the mask image is seen superimposed on the film. The operator may also select the reticle mask best suited for the image being observed.

(3) Push "Dye Apply" button to dye the desired area.

(4) Push "Laser Fire" button on. The shutter is automatically put on when the laser fires, and it is then removed after firing. The observer may then see the marked image through the microscope.

The energy applied by the laser is dissipated in a very short period of time, ½ microsecond. The heat is concentrated on only the area of application, while heat transferred is negligible to the adjacent areas of the dye. Consequently, very sharp edges are realized.

The optimum dye is that which requires the least amount of energy to be evaporated. Probably, a green or blue dye may be the best suitable, since it absorbs the red light of the laser. The dye characteristics must be such that it dries very quickly.

The following is a summary of the advantages gained by laser marking system:

(1) No mechanical parts touch the film during marking. Consequently, the possibility of marring the film is eliminated.

(2) The reticle used for marking is apart of an optical imaging system. It does not move during marking. Consequently, the accuracy of positioning of the mark, relative to the information area, is extremely high. Applicants have been able to achieve marking accuracy to better than one micron.

(3) The marking system contains provisions for illuminating the reticle. Consequently, the operator may observe the image of the mark superimposed on the area to be marked. This observations is possible prior to marking, so that the operator may change or reposition the mark. Optimum film marking can be assured under various imagery and conditions.

(4) The marking reticle is a mask, which can be larger than the image being formed on the film. Thus, if the image on the film is desired to be 0.05 x 0.05 inch, the mask may be made as large as 0.5 x 0.05 inch. An optical reduction of 10:1 can easily be achieved by a simple microscope objective. In this manner, the mask can be simply manufactured and shapes of extremely high contrast can easily be realized.

(5) Since the mask can be photographic, digital dots can easily be displayed by simple solenoids and associated discs. In addition, numbers and letters can also be added. The size of this information can easily be changed by merely utilizing a zoom lens for imaging or a lens turret for fixed discrete sizes.

(6) Very sharp lines and dots can be achieved where the gradient between the dye and the removed mark is achieved within 2 microns.

(7) Since the reticles can be made small or large, they can be made easily interchangeble. Remote interchange is possible. A multi-reticle turret can also be provided for quick selection.

(8) The utilization of laser marking allows marking of film with different dyes of various degrees of permanence.

(9) This invention provides an optical head which contains means for applying a dye, observing it, and marking it. The same optical head can be used to further analyze the marked film. All these functions are achieved without moving any parts within the marking system.

I claim:
1. Marking means for an object comprising,
a microscope having an eyepiece mounted over said object,
a beam splitter mounted in said microscope,
a shutter mounted between said beam splitter and said eyepiece,
a laser generator,
means to transmit the image of a visible pilot mark onto said object,
reticle means in the path of said laser beam to form said laser beam into an identifying shape, and
means to transmit said laser beam onto said beam splitter and onto said object, on the same spot as said pilot mark.

References Cited
UNITED STATES PATENTS

| | | | |
|---|---|---|---|
| 3,181,170 | 4/1965 | Akin | 331—94.5 X |
| 3,266,393 | 8/1966 | Chitayat | 95—1 |
| 3,289,099 | 11/1966 | Masters | 331—94.5 |
| 2,707,423 | 5/1955 | Back | 95—1.1 X |

OTHER REFERENCES

Book, "Masers and Lasers," Hogg et al., published by Maser, and Laser Associates, July 1962, p. 175.

Book, "Masers and Lasers", published by Technology Markets, May 1962, p. 54.

JOHN M. HORAN, Primary Examiner